(12) United States Patent
Ohira et al.

(10) Patent No.: US 6,517,250 B1
(45) Date of Patent: Feb. 11, 2003

(54) ROLLING BEARING

(75) Inventors: Koya Ohira, Mie (JP); Hidenobu Mikaki, Mie (JP); Mari Kataoka, Mie (JP); Takuya Ishii, Mie (JP); Kenji Ito, Mie (JP); Eiichiro Shimazu, Mie (JP); Takayuki Kawamura, Mie (JP)

(73) Assignee: NTN Corporation, Osaka (JP)

( * ) Notice: Subject to any disclaimer, the term of this patent is extended or adjusted under 35 U.S.C. 154(b) by 106 days.

(21) Appl. No.: 09/697,506

(22) Filed: Oct. 27, 2000

(30) Foreign Application Priority Data

Oct. 27, 1999 (JP) ............................. 11-305507
Apr. 7, 2000 (JP) ............................. 2000-105961
Jul. 14, 2000 (JP) ............................. 2000-214326

(51) Int. Cl.$^7$ ......................... F16C 33/56; F16C 33/76
(52) U.S. Cl. .................. 384/527; 384/477; 384/462; 384/492
(58) Field of Search ........................ 384/492, 462, 384/470, 477, 484, 523, 527

(56) References Cited

U.S. PATENT DOCUMENTS

| | | | | |
|---|---|---|---|---|
| 1,201,328 A | * | 10/1916 | Moran | 384/492 |
| 1,703,380 A | * | 2/1929 | Beemer | 384/477 |
| 1,767,107 A | * | 6/1930 | Yates | 384/527 |
| 1,901,580 A | * | 3/1933 | Bott | 384/477 |
| 5,783,528 A | * | 7/1998 | Rodenberg | 508/200 |
| 5,817,607 A | * | 10/1998 | Duncan et al. | 508/485 |
| 5,955,402 A | * | 9/1999 | Hirata et al. | 508/100 |
| 5,990,055 A | * | 11/1999 | Garmier | 508/150 |

* cited by examiner

Primary Examiner—Thomas R. Hannon
(74) Attorney, Agent, or Firm—Wenderoth, Lind & Ponack, L.L.P.

(57) ABSTRACT

An environment-friendly rolling bearing is proposed in which at least one of inner ring, outer ring, rolling elements, seals and retainer is formed of a biodegradable material.

7 Claims, 1 Drawing Sheet

ROLLING BEARING

BACKGROUND OF THE INVENTION

The present invention relates to a rolling bearing formed of a biodegradable material.

A rolling bearing includes an inner ring, an outer ring, rolling elements, a retainer and seals and contains a lubricant. The inner and outer rings and the rolling elements are usually made of a bearing steel or a ceramic material, and the retainer made of a ferrous material. The seal is usually formed of a ferrous material or rubber. Typical bearing lubes include grease and oil.

Rolling bearings are used as machine parts in various industrial machines. When their working life has expired, these machines are usually burned, dumped into the sea, left in unpopulated areas, or buried in the ground without dismounting the bearings.

In the natural environment, ferrous parts will rust and decompose with time while producing practically no harmful substances. But resin and rubber parts are extremely stable either in water, ground or air, thus causing harmful influence on the biosphere.

If a resin having fluidity is used as a bearing lubricant, it will leak out of the bearing and can damage the biosphere.

An object of the present invention is to provide an environment-friendly rolling bearing.

SUMMARY OF THE INVENTION

According to the invention, there is provided a rolling bearing comprising an inner ring, an outer ring, rolling elements, seals and a retainer, at least one of the inner ring, rolling elements, seals and retainer being made of a biodegradable material.

By using a biodegradable material, such parts will lose its shape with lapse of prolonged time, not impairing the biosphere.

Also, according to the present invention, retainers are used which are formed of a biodegradable resin mixed with a filler material.

By using such a material, the retainer can perform its function with sufficient strength. Also, it will lose its shape after a prolonged time and maintain life environment of living things.

By using a biodegradable lubricant, it is possible to prevent the lubricant from flowing into the ground or sea. Thus life environment of living thing will not be contaminated.

DETAILED DESCRIPTION OF THE PREFERRED EMBODIMENT

Figure 1:
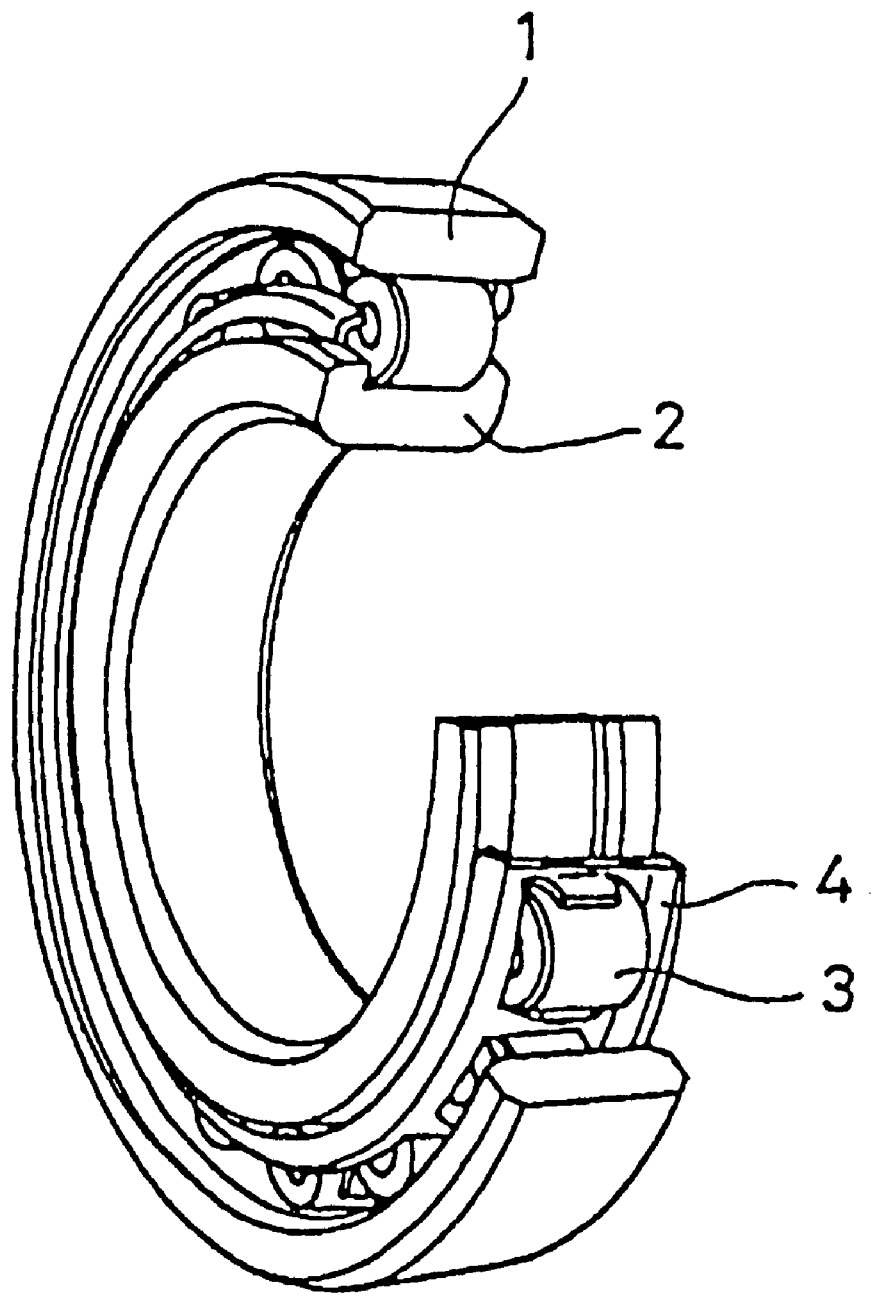
FIG. 1 shows a rolling bearing of the present invention, having an outer ring 1, an inner ring 2, rollers 3, and a retainer 4 for retaining the rollers.

The rolling bearing such as ball bearings embodying the present invention comprises an inner ring, an outer ring, rolling elements, seals and a retainer. At least one of these bearing parts are made of a biodegradable material. Preferably, the inner and outer rings and rolling elements are made of steel or ceramic material with at least one of the seals and the retainer made of a biodegradable material.

Preferably, at least one of the seal and the retainer of the rolling bearing should be formed of a mixture of a biodegradable resin and a filler material.

The bearing lubricant such as grease or oil may also be a biodegradable material.

Biodegradable materials usable in this invention include biodegradable resins, biodegradable lubricating oils and biodegradable greases.

Biodegradable resins are ones decomposed by microbial activity in the natural environment and include polyethylene terephthalate copolymer, polyhydroxycarboxylic acids, ester polymers of polyols and polycarboxylic acids such as polyalkylene alkanoate, polyesteramides, starch-modified resins, and cellulose compounds.

The polyethylene terephthalate copolymer may be polyethylene terephthalate-ethylene adipate.

The polyhydroxycarboxylic acids are polymers of hydroxycarbooxylic acids, and include, for example, a monopolymer of a hydroxycarboxylic acid such as poly(α-hydroxycarboxylic acid), and a copolymer of a plurality of kinds of hydroxycarboxylic acids such as poly(β-hydroxyalkanoate) and poly(ω-hydroxyalkanoate).

The hydroxycarboxylic acids usable in this invention include aliphatic hydroxycarboxylic acids such as glycolic acid, D-lactic acid, L-lactic acid, DL-lactic acid, 3-hydroxybutyric acid, 4-hydroxybutyric acid, 2-hydroxy-n-butyric acid, 2-hydroxy-3, 3-dimethylbutyric acid, 2-hydroxy-3-methylbutyric acid, 2-methyllactic acid, 2-hydroxycaproic acid, and 2-hydroxyvaleric acid.

The polycarboxylic acids usable in this invention include succinic acid and valeric acid. The polyols usable in this invention include ethylene glycol and 1,4-butane diol. The ester polymers of polycarboxylic acids and polyols include polybutylene succinate, polybutylene succinate-adipate copolymer, and polyethylene succinate.

The cellulose compounds usable in this invention include cellulose acetate.

Preferably, the inner and outer rings and rolling elements of the bearing are made of steel for strength. In view of sliding properties, flexibility or less brittleness when subjected to shocks, and strength stability at practical working temperature (room temperature to 80° C.), the retainer and seals should preferably be made from a biodegradable resin selected from polyethylene terephthalate copolymer (e.g. polyethylene terephtalate-ethylene adipate), polyburylene succinate, a mixture or a copolymer of polybutylene succinate and polylactic acid, polyhydroxylactic acid and cellulose acetate.

The biodegradable materials usable for the seals include, besides the abovementioned biodegradable resins, natural rubber, synthetic rubbers such as aliphatic polyester urethane, biodegradable thermoplastic elastomers, and aliphatic polyester resins. Among them, polyethylene terephthalate copolymer (e.g. polyethylene terephthalate-ethylene adipate), polybutylene succinate, a mixture or a copolymer of polybutylene succinate and polylactic acid, polyhydroxylactic acid and cellulose acetate are preferable.

The biodegradable lubricant should preferably be one having a biodegradability of 60% or more. A lubricant having a biodegradability of less than 60% will not decompose sufficiently in the environment.

The biodegradability is an index of biodegradability determined under the OECD 301C method (amended MITI method) which is described in "Chemical Product Testing Guideline" published by Organization for Economic Cooperation and Development (OECD).

For example, vegetable oils and biodegradable synthetic oils have a biodegradability of 60% or more. Such vegetable oils include rapeseed oil, castor oil, rice bran oil, soy bean oil and polymerized castor oil.

Biodegradable synthetic ester oils include diester oils obtained by reacting a dibasic acid and a branched alcohol, aromatic ester oils obtained by reacting an aromatic tribasic acid and a branched alcohol, and polyol ester oils obtained by reacting a polyhydric alcohol and a monobasic acid. They should have a biodegradability of 60% or more.

Specific examples of diester oils include dioctyl adipate (DOA), diisobutyl adipate, (DIB), dibutyl adipate (DBA), dioctyl azelate (DOZ), dibutyl sebacate (DBS) and dioctyl sebacate (DOS). Specific examples of aromatic ester oils include trioctyl trimellitate, (TOTM), tridecyl trimellitate and tetraoctyl piromellitate.

Polyhydric alcohols used to prepare polyol ester oils include trimethylolethane (TME), trimethylolpropane (TMP), pentaerythritol (PE), dipentaneerythritol (DPE), neopentyl glycol (NPG) and 2-methyl-2-propyl-1, 3-propanediol (MPPD).

Monobasic acids used to prepare polyol ester oils are mainly univalent fatty acids having a carbon number of 4–18, such as acetic acid, valeric acid, caproic acid, enanthic acid, pelargonic acid, undecanoic acid, lauric acid, myristic acid, palmitic acid, beef tallow, stearic acid, capric acid, undecylenic acid, linderic acid, tsuzuic acid, physeterc acid, myristoleic acid, palmitoleic acid, petroselinic acid, oleic acid, elaidic acid, ascorbic acid, vaccenic acid, sorbic acid, linoleic acid, linolenic acid, sabinic acid, and ricinoleic acid. The monobasic acid to be reacted with a polyhydric alcohol may be one or plural.

The biodegradable lubricating grease used in this invention may be a semi-solid lubricant formed by thickening any of the above-listed biodegradable lubricants by adding a thickening agent and having a biodegradability of 60% or more under the OECD 301C method. Thickening agents usable include metallic soaps, fine powder of silica and bentonite and urea compounds. Commercially available biodegradable greases may be used.

If each element forming a bearing, including a retainer and seals, is formed of a biodegradable resin, it is preferable to add a filler to the biodegradable resin to increase the strength.

For this purpose, any filler can be used without any limitation if it disperses well in the major component, i.e. biodegradable resin, and imparts strength to the resin according to the intended use. As specific examples of the filler, fibrous fillers such as glass fiber, metallic fiber, polyvinyl alcohol fiber, carbon fiber, potassium titanate whisker, zinc oxide whisker, calcium sulfate whisker and aluminum borate whisker, mica and talc can be cited.

The filling amount of the filler relative to the biodegradable resin is preferably 5–40%, more preferably 10–40%. If the amount is less than 5%, the strength will not be sufficient. If it exceeds 40%, the biodegradability will be impaired.

EXAMPLE 1

608 rolling bearings (outer diameter: 22 mm, inner diameter: 8 mm, 7 mm wide) were manufactured which had inner and outer rings and rolling elements made of stainless steel SUJ2, and a retainer and seals made of a biodegradable resin (LACEA M-151, 5:5 mixture of polybutylene succinate and polylactic acid, made by Mitsui Chemical) and contained a biodegradable grease (Biotemp PL made by KYODO YUSI Co.,Ltd., base oil: biodegradable synthetic ester oil, thickening agent: metallic soap). The rolling bearings were subjected to an endurance test under ordinary operating conditions (Fa: 19.6N, revolving speed: 3600 rpm, temperature: 60° C.). The bearings ran for over 2000 hours.

After the endurance test, the bearings were subjected to degradability test by burying in the ground of 35° C. containing 30% water (10 cm from the ground surface).

The bearings were recovered from the ground six months later to observe their appearance and weigh the individual parts. It was found out that the retainer and seals scarcely retained their original shapes, while the metallic parts, i.e. inner and outer rings and rolling elements retained their original shapes. Also, the retainer and seals lost weight by 10%. Grease was observed neither inside nor outside the bearings.

EXAMPLE 2

The same bearings as the first Example except that the retainer and seals were made of BIONOLLE #1020 made by Showa Highpolymer Co.,Ltd. (polyburylene succinate) were manufactured and subjected to the same endurance test as in the first Example. The bearings ran for over 2000 hours.

After the endurance test, the bearings were tested for degradability by burying in the ground of 35° C. containing 30% water (10 cm from the ground surface).

The bearings were recovered from the ground six months later to observe their appearance and weigh the individual parts. It was found out that the retainer and seals scarcely retained their original shapes, while the metallic parts, i.e. inner and outer rings and rolling elements retained their original shapes. Also, the retainer and seals lost weight by 10%. Grease was observed neither inside nor outside the bearings.

EXAMPLE 3

The rolling bearings were made in the same manner as in the first Example except that the retainer and seals were made by melting and kneading BIONOLLE #1020 (polyburylene succinate made by Showa Highpolymer Co., Ltd.) with 30% of glass fiber (CS03JA429T made by ASAHI GLASS Co.,Ltd) and subjected to the same endurance test as in the first Example. The bearings ran for over 2000 hours.

After the endurance test, the bearings were tested for degradability by burying in the ground of 35° C. containing 30% water (10 cm from the ground surface).

The bearings were recovered from the ground six months later to observe their appearance and weigh the individual parts. It was found out that the retainer and seals scarcely retained their original shapes, while the metallic parts, i.e. inner and outer rings and rolling elements retained their original shapes. Also, the retainer and seals lost weight by 10%. Grease was observed neither inside nor outside the bearings.

EXAMPLE 4

The rolling bearings were made in the same manner as in the first Example except that the retainer and seals were made of a polyethylene terephthalate copolymer containing a filler (BIOMAX WUH made by Du Pont) and subjected to the same endurance test as in the first Example. The bearings ran for over 2000 hours.

After the endurance test, the bearings were tested for degradability by burying in compost of 60° C. The bearings were recovered from the compost three weeks later to observe their appearance and weigh the individual parts. It was found out that the retainer and seals lost weight by 30%, while the metallic parts, i.e. inner and outer rings and rolling elements retained their original shapes. The grease was observed only inside the bearings.

Comparative Example 1

608 rolling bearings (outer diameter: 22 mm, inner diameter: 8 mm, 7 mm wide) were manufactured which had inner and outer rings and rolling elements all made of stainless steel SUJ2, a retainer made of polyamide resin (Ultramid A3HG2 made by BASF), and seals made of nitrile rubber (JSR N made by JSR), and contained a mineral grease (Alvania Grease No. 2 made by SHOWA SHELL SEKIYU K.K., base oil: mineral oil, thickening agent: metallic soap). The rolling bearings were subjected to an endurance test under ordinary operating conditions (Fa: 19.6N, revolving speed: 3600 rpm, temperature: 60° C.). The bearings ran for over 2000 hours.

After the endurance test, the bearings were tested for degradability by burying in the ground of 35° C. containing 30% water (10 cm from the ground surface).

The bearings were recovered from the ground six months later to observe their appearance and weigh the individual parts. It was found out that the retainer and seals, as well as the inner and outer rings and rolling elements, retained their original shapes. No significant loss of weight of the retainer and seals was observed. The surrounding soil was contaminated with the grease that leaked from the bearing.

If the rolling bearing according to the present invention is buried in the ground, the parts made of a biodegradable material will decompose to soil, thus having little mal effect on the environment. The use of a biodegradable lubricant avoids contamination of soil. Thus rolling bearings are provided which are friendly to the environment.

The retainer formed of a mixture of a biodegradable resin and a filler has a sufficient strength due to the addition of a filler. Thus a rolling bearing using such a retainer can withstand use for a prolonged time. Also, if such a rolling bearing is buried in the ground after use, the retainer will decompose to soil, thus having little mal effect on the environment. The rolling bearing of this invention will not damage the environment when discarded.

What is claimed is:

1. A rolling bearing comprising an inner ring, an outer ring, rolling elements and a retainer, said inner ring, outer ring and rolling elements being made of steel, said retainer being formed of polyethylene terephthalate copolymer, polybutylene succinate or a mixture or a copolymer of polybutylene succinate and a polylactic acid.

2. The rolling bearing as claimed in claim 1 further comprising seals formed of polyethylene terephthalate copolymer, polybutylene succinate or a mixture or a copolymer of polybutylene succinate and a polylactic acid.

3. A rolling bearing comprising an inner ring, an outer ring, rolling elements, seals and a retainer, said inner ring, outer ring and rolling elements being made of steel or a ceramic material, and wherein the retainer is formed of a biodegradable material which is a biodegradable resin and a filler is mixed with said biodegradable resin, and the seals are optionally formed of a biodegradable material.

4. The rolling bearing as claimed in claim 3 wherein said biodegradable resin is selected from a group consisting of a polyethylene terephthalate copolymer, polybutylene succinate, polyhydroxy butyric acid, polylactic acid, and their mixture and copolymer.

5. The rolling bearing as claimed in any of claims 1, 2 or 3 further comprising a biodegradable lubricant as a lubricant.

6. The rolling bearing as claimed in claim 5 wherein said biodegradable lubricant is a biodegradable grease comprising a biodegradable synthetic ester oil as a base oil, and a metallic soap as a thickening agent.

7. The rolling bearing as claimed in claim 5 wherein said biodegradable lubricant is a biodegradable grease comprising a vegetable oil as a base oil, and a metallic soap a thickening agent.

* * * * *